United States Patent
Hofman et al.

(10) Patent No.: US 9,430,755 B2
(45) Date of Patent: Aug. 30, 2016

(54) SYSTEM AND METHOD TO ENABLE COMMUNICATION GROUP IDENTIFICATION

(75) Inventors: Jake Hofman, New York, NY (US); Winter Mason, New York, NY (US); Duncan James Watts, New York, NY (US)

(73) Assignee: Yahoo! Inc., Sunnyvale, CA (US)

( * ) Notice: Subject to any disclaimer, the term of this patent is extended or adjusted under 35 U.S.C. 154(b) by 205 days.

(21) Appl. No.: 13/539,071

(22) Filed: Jun. 29, 2012

(65) Prior Publication Data

US 2014/0006523 A1 Jan. 2, 2014

(51) Int. Cl.
  *G06F 15/16* (2006.01)
  *G06Q 10/10* (2012.01)
  *G06Q 50/00* (2012.01)

(52) U.S. Cl.
  CPC ............. *G06Q 10/10* (2013.01); *G06Q 50/01* (2013.01)

(58) Field of Classification Search
  CPC .. G06Q 10/107; G06Q 50/01; H04L 67/306; H04L 29/1215; H04L 61/1564
  USPC ................................................ 709/204–206
  See application file for complete search history.

(56) References Cited

U.S. PATENT DOCUMENTS

| | | | | |
|---|---|---|---|---|
| 7,252,198 B2* | 8/2007 | Togawa | ............. | H04L 29/1215 209/206 |
| 8,161,120 B2* | 4/2012 | Tan | ...................... | G06Q 10/107 709/204 |
| 2003/0233419 A1* | 12/2003 | Beringer | ............... | G06Q 10/107 709/206 |
| 2006/0149820 A1* | 7/2006 | Rajan | ................... | G06Q 10/107 709/206 |
| 2009/0013043 A1* | 1/2009 | Tan | ...................... | G06Q 10/107 709/205 |
| 2010/0017478 A1* | 1/2010 | Mejia | ..................... | G06Q 10/00 709/206 |
| 2010/0017487 A1* | 1/2010 | Patinkin | ............... | G06Q 10/107 709/206 |
| 2011/0289153 A1* | 11/2011 | Hull | ..................... | G06Q 10/107 709/205 |
| 2012/0203846 A1* | 8/2012 | Hull | ..................... | G06Q 10/107 709/206 |

* cited by examiner

Primary Examiner — Edward Kim
(74) Attorney, Agent, or Firm — Martine Penilla Group, LLP

(57) ABSTRACT

Methods, system and computer readable medium for discovering social groups include extracting activity related data associated with a user's social interactions from a source. The activity related data identifies information related to social contacts used during the social interactions at the source. The activity related data of the user is analyzed to identify co-occurrences of the social contacts. The co-occurrences determine a set of related contacts. The set of related contacts identified from the activity related data are clustered into distinct social groups. The social groups are used by a user to facilitate subsequent interactions.

16 Claims, 8 Drawing Sheets

Welcome to Autogroup, a tool designed to assist you in organizing your address book. Autogroup will use your past email activity to find groups of related contacts (people who you tend to email together).

You can then export these groups back to your email provider, where you can use them to compose emails, share photos, etc. You may also reorder, delete or edit the suggested groups to improve their relevance.

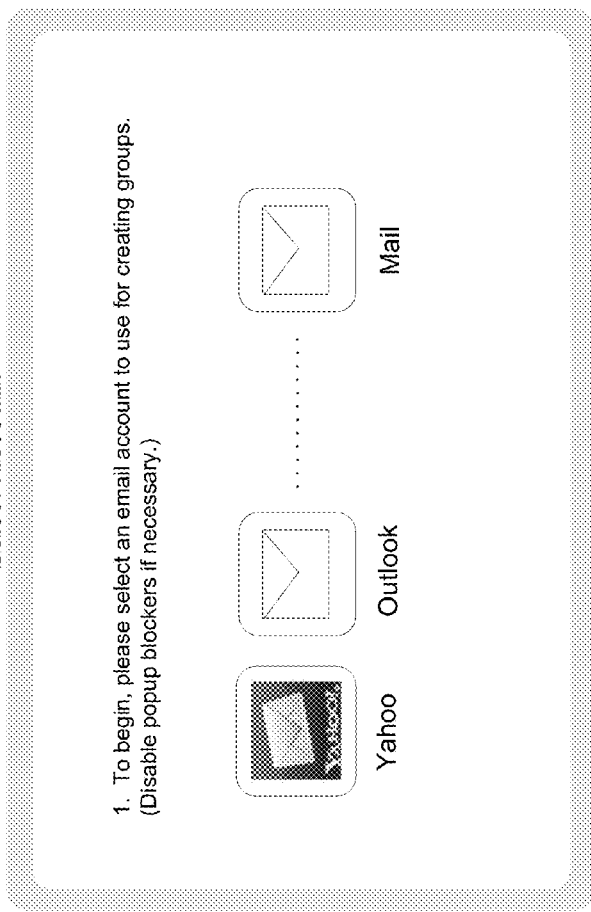

Autogroup retrieves and stores anonymized copies of email headers (recipients and subject lines). Autogroup does not retrieve or store any email content.

Figure 3

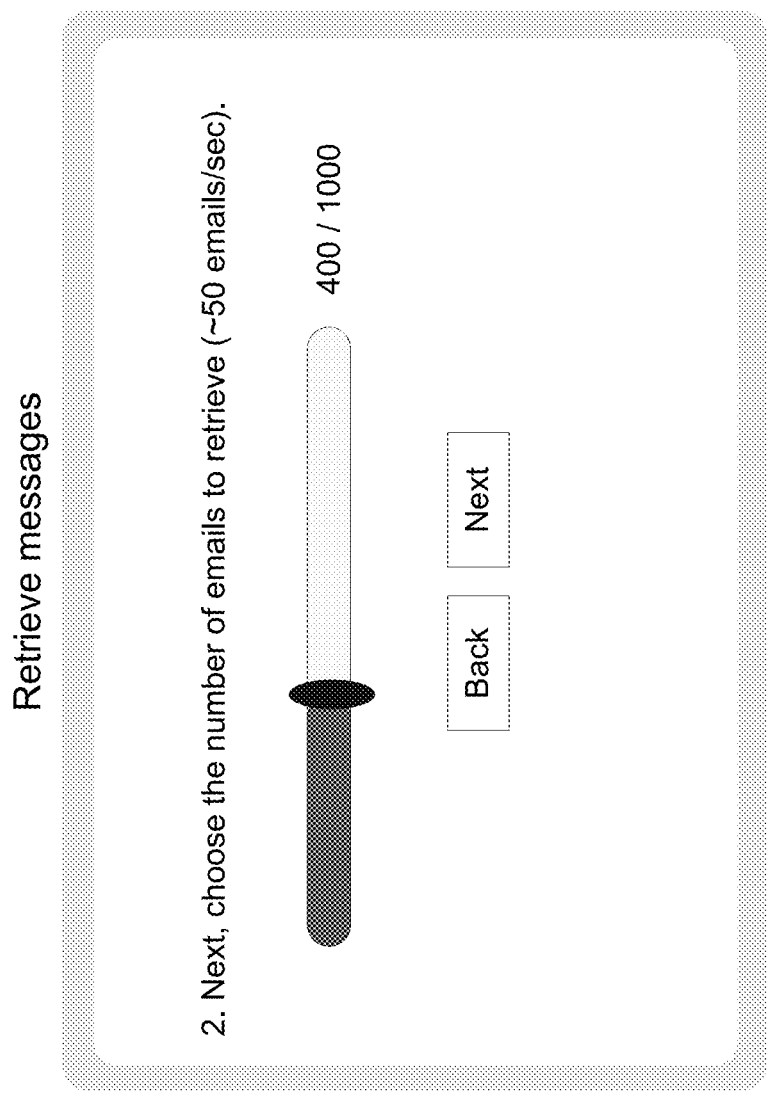

SYSTEM AND METHOD TO ENABLE COMMUNICATION GROUP IDENTIFICATION

BACKGROUND

1. Field of the Invention

The present invention relates to electronic communications, and more particularly, to inferring social groups based on online activity of a user.

2. Description of the Related Art

Communications in the digital era has evolved from communicating via emails with one or two users at a time to interacting with various groups of users across different service providers and social networks. Each social network behaves like a monolithic entity but is actually composed of small sub-groups. As a result, social contacts within some of the sub-groups may include social contacts from other sub-groups, leading to the formation of concentric circles of these social contacts. For instance, members (i.e. social contacts) within a development team in an office are part of an overall office team, which is part of a professional entity and which is part of an industry. When circles of social contacts are defined for the aforementioned example, the sub-groups of members are represented as concentric circles with the members of the development team forming the inner-most concentric circle and the members of the industry forming the outermost concentric circle with each circle from inside moving outward expanding the social contacts of the user. Other circles of social contacts may intersect each other at various levels depending on the level of commonality that exists amongst the users in the various groups. For instance, a user's circle of friends may include friends from the user's professional circle, from the development team in which the user is a part, and from non-professional circle. A user trying to interact with different social contacts has to navigate to all the various circles of contacts and select the social contacts from each circle, which can be overwhelming and difficult to undertake.

In order to alleviate this problem for the user, some of the social networking service providers include tools for specifying social contacts for a social interaction. The main disadvantage with these tools is that each circle has to be defined manually in a meticulous manner, which is very time-consuming and intense. Other social networking sites provide a tool that analyzes a user's profile and recommends/suggests a small list of users that best fit the user's profile. For instance, the tool may determine that the user belongs to a particular organization and recommend social contacts from within the organization. However, this list is very narrow and is limited to members of the organization, such as college, workplace, etc., and does not include contacts outside the organization. Further, the small list of suggested social contacts may include users from the circle of social contacts (i.e. organization) that a user may never have an interest to interact with but are included solely for the reason that they belonged to the same circle of social contacts as the user. Providing such a list defeats the purpose for which it was generated, viz., identifying social contacts within the circle that the user is interested in interacting.

It would, therefore, be desirable to have a tool that provides a way to organize a user's social contacts based on the user's communication pattern irrespective of which organization or groups the social contacts belong.

It is in this context that the embodiments of the invention arise.

SUMMARY

Embodiments of the present invention describe methods, algorithm and a system that allows discovering social groups based on user's social interaction. More than one social group can be discovered with each group having a set of social contacts that the user normally interacts. The algorithm analyzes a user's social interaction patterns from a particular source(s) and infers popular groups of users or circles of users. The popular groups of users are clustered into distinct social groups. These distinct social groups are used for subsequent social interactions at a source. The distinct social groups may be imported into other social networking sites/sources and is not restricted to social interactions at any particular source.

It should be appreciated that the present invention can be implemented in numerous ways, such as, methods, systems and computer readable medium. Several inventive embodiments of the present invention are described below.

In one embodiment, a method for discovering social groups, is disclosed. The method includes extracting activity related data associated with a user's social interactions from a source. The activity related data identifies information related to social contacts used during the social interactions at the source. The activity related data of the user is analyzed to identify co-occurrences of the social contacts. The co-occurrences determine a set of related contacts. The set of related contacts identified from the activity related data are clustered into distinct social groups. The social groups are used by a user to facilitate subsequent interactions.

In another embodiment, a computer program product comprising program instructions embodied on a computer readable medium for implementing a method used to discover social groups, is disclosed. The program instructions include program instructions for extracting activity related data associated with a user's social interactions from a source. The activity related data identifies information related to social contacts used in the social interactions at the source. The program instructions further includes program instructions for analyzing the activity related data of the user to identify co-occurrences of the social contacts. The co-occurrences determine a set of related contacts. The program instructions further includes program instructions for clustering the set of related contacts identified from the activity related data into distinct social groups. The social groups are used by a user to facilitate subsequent interactions.

In yet another embodiment, a system for discovering social groups, is disclosed. The system includes a server executing an algorithm that is configured to extract activity related data associated with a user's social interactions from a source. The activity related data identifies information related to social contacts used in the social interactions at the source. The algorithm is further configured to analyze activity related data of the user to identify co-occurrences of the social contacts. The co-occurrences determine a set of related contacts. The algorithm is also configured to cluster the set of related contacts identified from the activity related data into distinct social groups. The social groups are used by a user to facilitate subsequent interactions.

The embodiments of the invention provide an efficient algorithm for discovering social groups based on the analysis of a user's interaction obtained from a source, such as an email. The social groups identify sets of social contacts that the user normally interacts with and organizes the identified sets of social contacts into distinct social groups. The social groups can be used in any type of social interaction, such as for photo sharing, scheduling evites, scheduling meetings, etc., and is not restricted to emails. A particular social contact may be part of more than one social group. When a particular social contact is in more than one social group, each of the related social groups is properly tagged based on context of the social interaction so that the appropriate social group can be identified during subsequent social interaction.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIG. 3 illustrates the first of the four steps depicted in FIG. 2 followed for discovering social groups for a user, in one embodiment of the invention.

FIG. 4 illustrates the second of the four steps depicted in FIG. 2 followed for discovering social groups for a user, in one embodiment of the invention.

DETAILED DESCRIPTION

Broadly speaking, the embodiments of the present invention provide methods, system and computer readable medium utilizes an algorithm on a server to extract activity related data from a user's social interaction at a source, analyze the activity related data to identify co-occurrences of the social contacts in the user's social interactions and cluster a set of social contacts co-occurring in the interactions into distinct social groups. Each of the resulting social groups identifies users that are normally grouped together during the user's various social interactions. Each of the social groups may be distinctly identified using content-based tags. Once the social groups are generated, the social groups may be reviewed and fine-tuned. The fine-tuning of the social groups may entail adding or deleting social contacts from the one or more social groups, updating the information for the social contacts in one or more social groups, reorder the social contacts in one or more social groups based on their relevance. The social groups are used during subsequent interaction by the user.

The various embodiments provide an efficient tool that automatically extracts a select number of activity related data from one or more sources, analyzes the activity related data to identify co-occurrence of contact related data so as to obtain a set of related contacts, and clusters the related contacts into appropriate social groups. In addition to extracting and analyzing contact related data, the subject and content of the activity related data may be extracted from activity related data and analyzed. Accordingly, the topic of the subject and content determining the context of the activity, are tokenized and these tokens are used along with the contact related data during the formation of distinct social groups. The clustering makes it possible to quickly identify a set of related contacts the user usually interacts with without having to wade through the user's address book. Moreover, since the activity related data clearly identifies the recipients that are commonly grouped together, identifying an incorrect user is automatically eliminated. For instance, if the user's address book shows three friends that have same first name, Bob Smith (professional contact), Bob Mandell (work place buddy), Bob Peck (friend in the neighborhood), the clustering of the activity related data would identify the correct Bob to use for a user's subsequent social interaction based on the context of the social interaction. Other advantages will become apparent from the following detailed description of the accompanying drawings.

Figure 1:
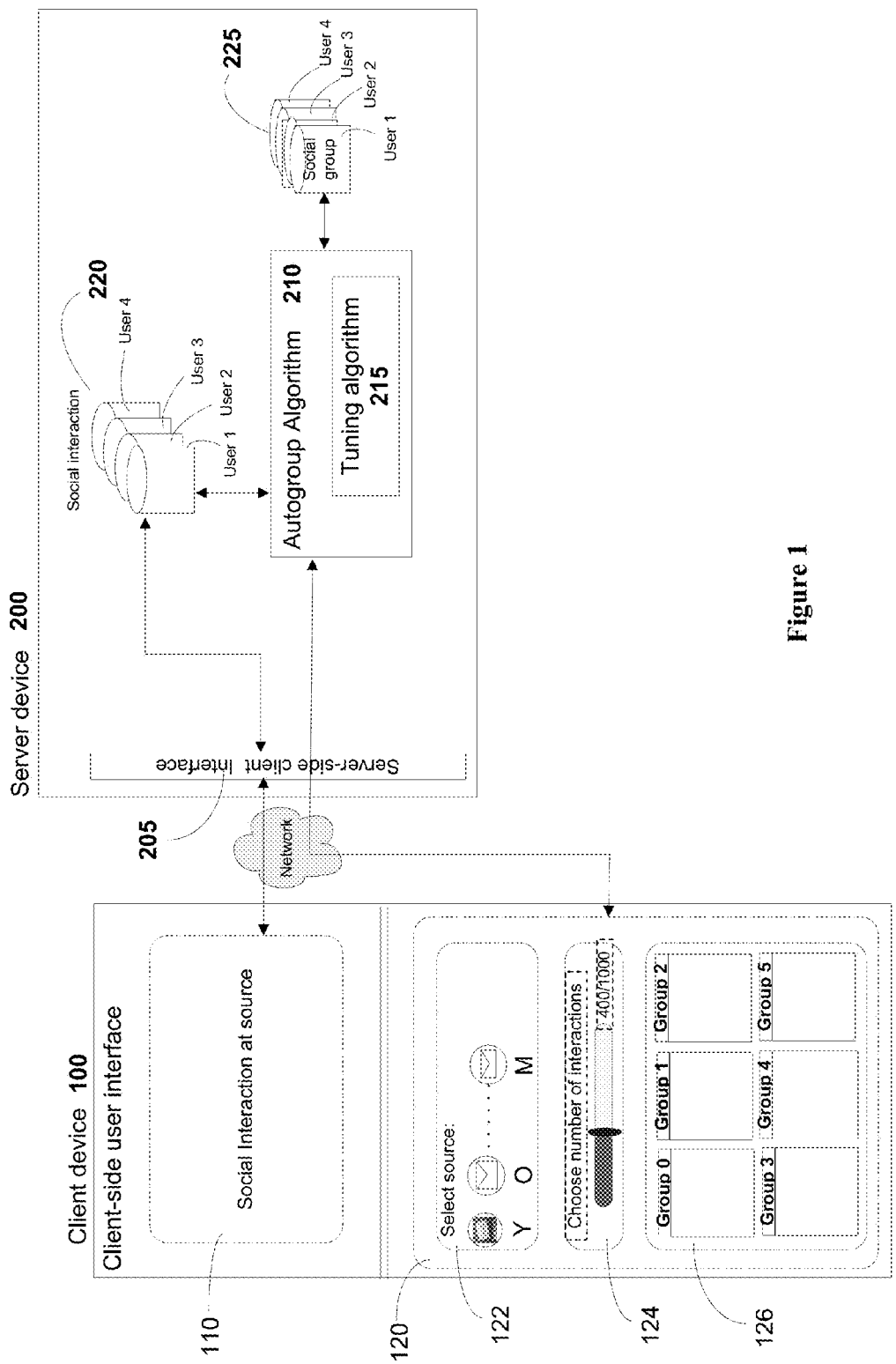
FIG. 1 illustrates a simple block diagram of a system identifying various modules used in enabling a private conversation for a content provided on a website, in one embodiment of the invention.

FIG. 1 illustrates an exemplary system used in discovering social groups by extracting information related to user's social interactions with other users. The system includes a client device 100 with a client-side user interface that allows a user to access a source for enabling social interaction with other users. In one embodiment, the source could be an email service provider or a social network and the access may be a link to the social interaction service provided by the service provider. In one embodiment, the user interface could be a webpage 110 provided by a service provider, wherein the webpage includes various links to access different social interaction services provided by different sources. The client-side user interface includes a second user interface 120 that is provided by an algorithm, such as an autogroup algorithm 210, during a discovery process for generating social groups, in one embodiment. The second user interface may be one or more webpages that are presented by the algorithm to a user to receive user input during the generation of the social groups. For instance, the second user interface may provide a webpage 122 to receive user's selection of one or more sources to extract the interactivity data of a user; a webpage 124 to determine the number of user interactions from the source that needs to be considered for generating the social groups; and webpage 126 that provides a list of generated social groups based on the analysis of the interactions by the algorithm on the server.

The algorithm executed by a processor on a server interacts with the client-device through a server-side client interface 205 over the network, such as the Internet. Data from social interactions initiated at one or more sources from the client-side are stored in a database, such as social interaction database 220. The database 220 may store the social interaction data for a user from each source distinctly or may keep the interaction data from all the sources for the user together. The algorithm may request and obtain information from a user interface at the client-device 100 to determine the source(s) and the number of social interactions to be considered for generating social groups, as illustrated in webpages 122 and 124. Based on the information obtained from the user interface, the algorithm extracts the activity related data associated with a particular source or associated with a plurality of sources from the database 220. In either case, the extracted data is analyzed by the algorithm 210 to determine if there are any co-occurrences of social contacts. For instance, every time a user X sent an email to user A, he also sent it to users B and C. Accordingly, the algorithm 210 determines the trend that users A, B and C are co-occurring in the same social interactions initiated by user X. The algorithm will identify this trend in the social interactions from the source(s) and cluster these users to generate a social group for user X with users A, B and C as the social group's members. Similarly, every time when user X interacted with users D, user X also interacted with users E, F and G, then the algorithm will identify this trend and generate a second social group for user X with users D, E, F and G as the second social group's members. Further, when user X interacted with users D, E, F and G, he may have interacted with user H some of the times. The algorithm would detect this trend of infrequent addition of user H in some of the interactions with users D, E, F and G, and may suggest user H to be included in the social group that includes users D, E, F and G as members. In addition to including the infrequent user, the algorithm may provide some form of indicator to identify user H as having a weaker social link with users D, E, F and G. The autogroup algorithm 210 may use a clustering algorithm, such as a Latent Dirichlet Allocation algorithm, which is a mixed-membership clustering algorithm for analyzing the extracted data from the database 220 and identifying the co-occurrence of social contact data and to determine the strength of the social link of each of the members in the social group in relation to other members. In one embodiment, in addition to the social contact information, content and subject of the social interaction may also be considered during analysis to determine co-occurrence of data when social groups are generated. Keywords in the content and subject matter are identified and used in the analysis of social interactions. The content and subject matter identify the context of the interaction. In one embodiment, once the context of the social interaction has been identified, the algorithm determines if particular social contacts belong to particular social groups or not. In one embodiment, the determination uses probabilistic result assignment and performance. Other embodiments can use other determination processes. Upon determining that the particular social contacts belong to specific social groups, the social group is generated and the corresponding social contacts are assigned to the social group. The sequence of the social contacts in the social group may rely on the strength of the social link of each member.

In one embodiment, the subject matter of the social interaction may also be used as tags for naming the social groups generated for the social interactions of a user. The social contacts within the social groups may be fine-tuned by pruning or adding contacts based on user preference. In one embodiment, the social groups may be pruned or additional contacts added based on probability of membership for social contacts to social groups being more or less selective. A tuning algorithm 215 within the autogroup algorithm 210 may be used to prune or add contacts to a social group.

A particular social contact may be present in more than one social group. This may be due to the fact that during various social interactions the user may have included social contacts from different circles. In order to ensure that the user refers to an appropriate social group when trying to socially interact with a particular social contact, appropriate name tags are used, as mentioned above.

Once the social groups are generated, the algorithm stores the social group information for each user in a social group database 225. The algorithm may refer to this social group database 225 to identify an appropriate social group when a user wants to initiate social interaction with one or more social contacts of the user. The generated social groups are presented to the user on a webpage 126 at the user interface of the client-device 100 for review and fine-tuning. As mentioned earlier, the fine-tuning may involve pruning or adding social contacts to a social group.

Figure 2:
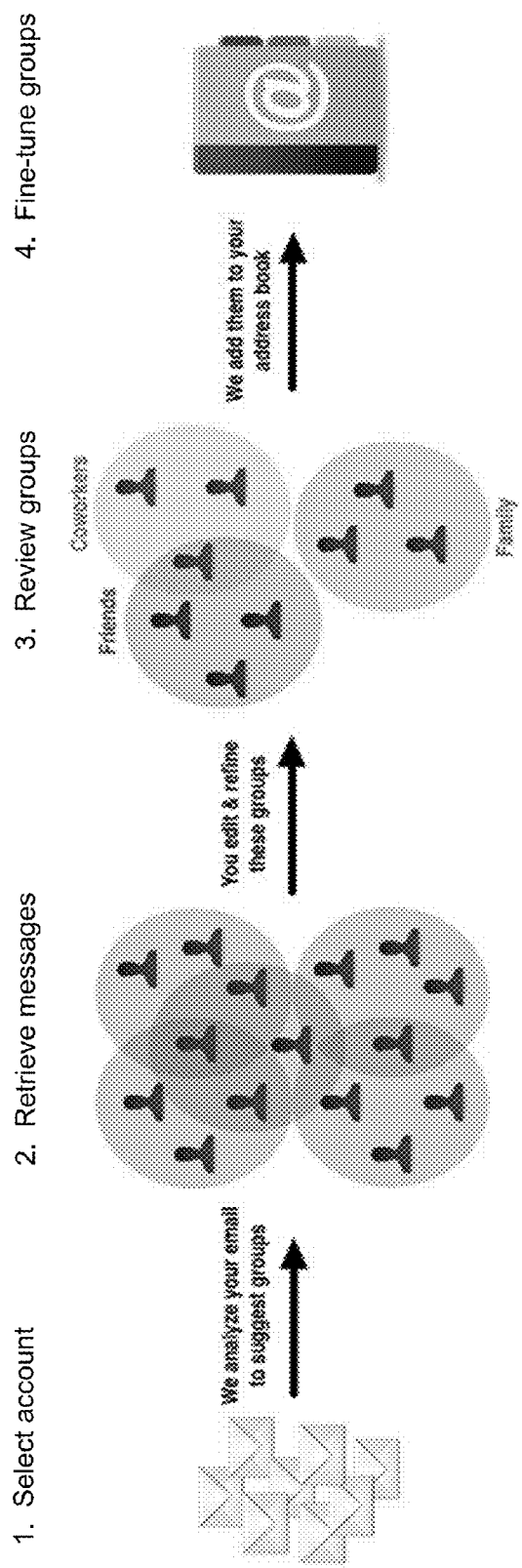
FIG. 2 illustrates the various steps used in discovering social groups, in one embodiment of the invention.

FIG. 2 illustrates the various steps/stages followed by the algorithm during the discovery of the social groups for a user. The various steps/stages include a selection phase, a retrieval phase, a review phase and tuning phase. Each of the steps/stages is described in detail with reference to FIGS. 3-6. As can be seen, a particular source (i.e. account) is selected to extract social interactions of a user. As mentioned earlier, the embodiments are not restricted to selecting one source but may be extended to include selection of multiple sources for extracting social interactions. Once the source(s) is identified, social interaction information is extracted from the identified source. The social interaction information may identify social contacts that may be part of more than one social group, as indicated in the intersection of the various circles of social contacts under "Retrieve messages" step in FIG. 2. The algorithm analyzes the social contacts and forms multiple social groups. The social groups are reviewed and refined. Additional fine-tuning of the social groups is made so as to define an optimal list of social contacts in each social group. Each of these social groups is stored with distinctive name tags so that they can be referred during subsequent interactions initiated by the user.

FIG. 3 illustrates the first step in the process used for generating social groups for a user. The algorithm, such as the autogroup algorithm, identifies a list of sources from which to extract social interaction data and presents it at the user interface of the client device for a user to select. As illustrated, a list of email service providers has been identified. The various sources identified in FIG. 3 are exemplary and should not be considered restrictive. Additional sources, such as social network sources, may also be identified and presented to the user for selection. In the embodiment illustrated in FIG. 3, the algorithm seeks selection of a single source. In another embodiment, the algorithm may seek the selection of more than one source for mining social interaction data. Upon selection of one or more sources, the algorithm will access the address book, friend list or social contacts of the user at the selected source(s) to organize the related social contacts into groups. In addition to the address book/friend list/social contacts, the algorithm may retrieve and store copies of email headers or social interaction recipients and subject lines.

FIG. 4 illustrates the second step in the process for generating social groups for a user. In the second step, the algorithm seeks a number of social interactions, such as emails, to retrieve from the selected source(s) in order to organize the user's social contacts. For instance, the algorithm may seek a number of emails to retrieve from an email service provider (i.e. source). Based on the number specified by a user, the algorithm retrieves the appropriate number of social interactions from the selected source(s) for analysis and organization.

Figure 5:
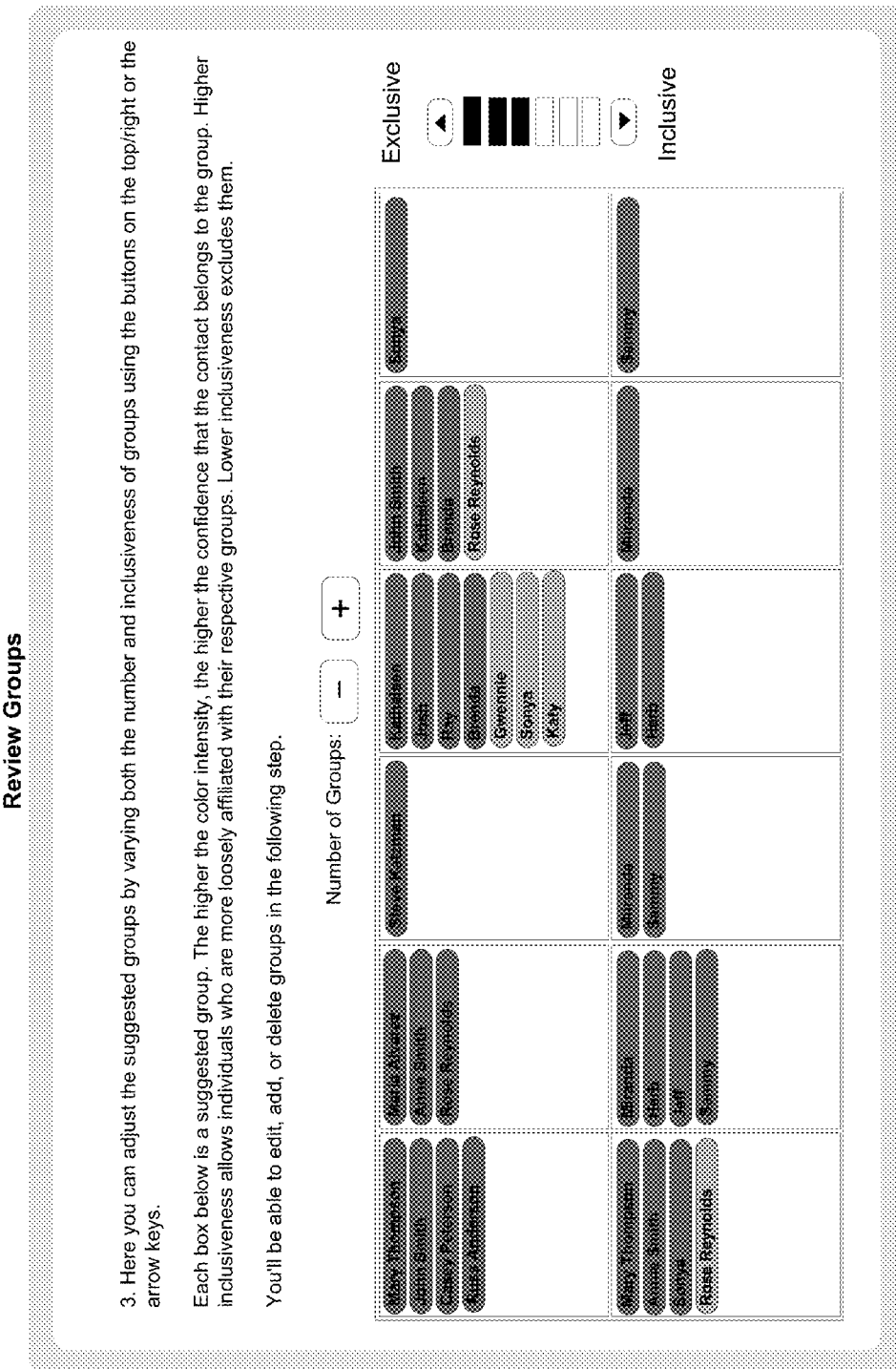
FIG. 5 illustrates the third of the four steps depicted in FIG. 2 followed for discovering social groups for a user, in one embodiment of the invention.

FIG. 5 illustrates the third step in the process for generating social groups for a user. In this step, the algorithm organizes the social contacts identified in the retrieved social interactions and organizes them into respective groups based on their co-occurrences in the social interactions. FIG. 5 identifies a plurality of boxes with each box identifying a suggested list of social contacts that belong together based on the social interaction of the user. The color intensity associated with each social contact in each box is indicative of the level of confidence that the particular social contact belongs in the box. The level of confidence of the particular social contact identifies the strength of the social link/ affiliation between the particular social contact with other social contacts in the group. This could be based on the number of social interactions in which the particular social contact was included with the remaining members of the social group. Higher the color intensity, the higher the confidence level that the particular social contact belongs to the group represented in the box. The algorithm also provides ways to tune the suggested groups by varying number and inclusiveness of groups. In one embodiment illustrated in FIG. 5, button options are provided to adjust the number of groups. Additional buttons are provided to adjust the inclusivity of a social contact in respective groups (i.e. boxes) in which they appear. Higher inclusiveness allows social contacts who are more loosely affiliated with their respective groups. Lower inclusiveness excludes them from their respective groups.

Figure 6:
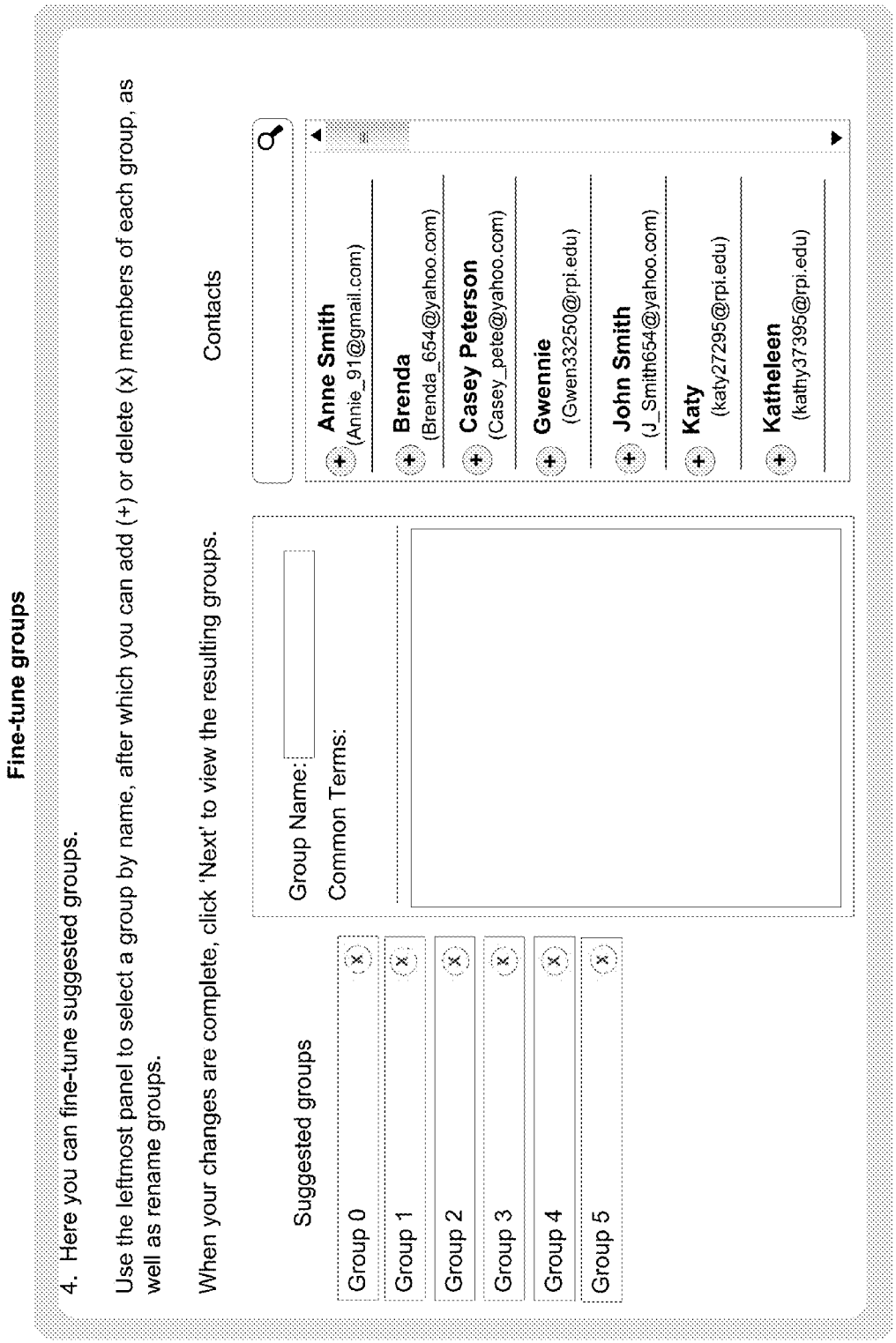
FIG. 6 illustrates the fourth of the four steps depicted in FIG. 2 followed for discovering social groups for a user, in one embodiment of the invention.

FIG. 6 illustrates additional options provided by the algorithm to fine-tune the generated groups. In order to fine-tune a group, the algorithm first provides a list of suggested groups at the user interface of the client-device and seeks selection of a particular group to fine-tune. The fine-tuning would include adjusting one or more attributes of the social group including adding or deleting social contacts in a particular group, rename groups, update social contacts information including contact details, etc. When a particular suggested group is selected for fine-tuning at the user interface, the algorithm will automatically fill out the details in the group name box, common terms that are associated with the group, such as name tags, keywords, etc., and a list of social contacts that belong to the selected group. The algorithm then provides a user with the ability to fine-tune the various attributes of the social contacts in the group, including group name, keywords, contact list, contact information, etc. Changes based on the fine-tuning are updated to the respective social group data in the social group database 225 on the server. The algorithm uses this updated list for subsequent interactions.

Figure 7:
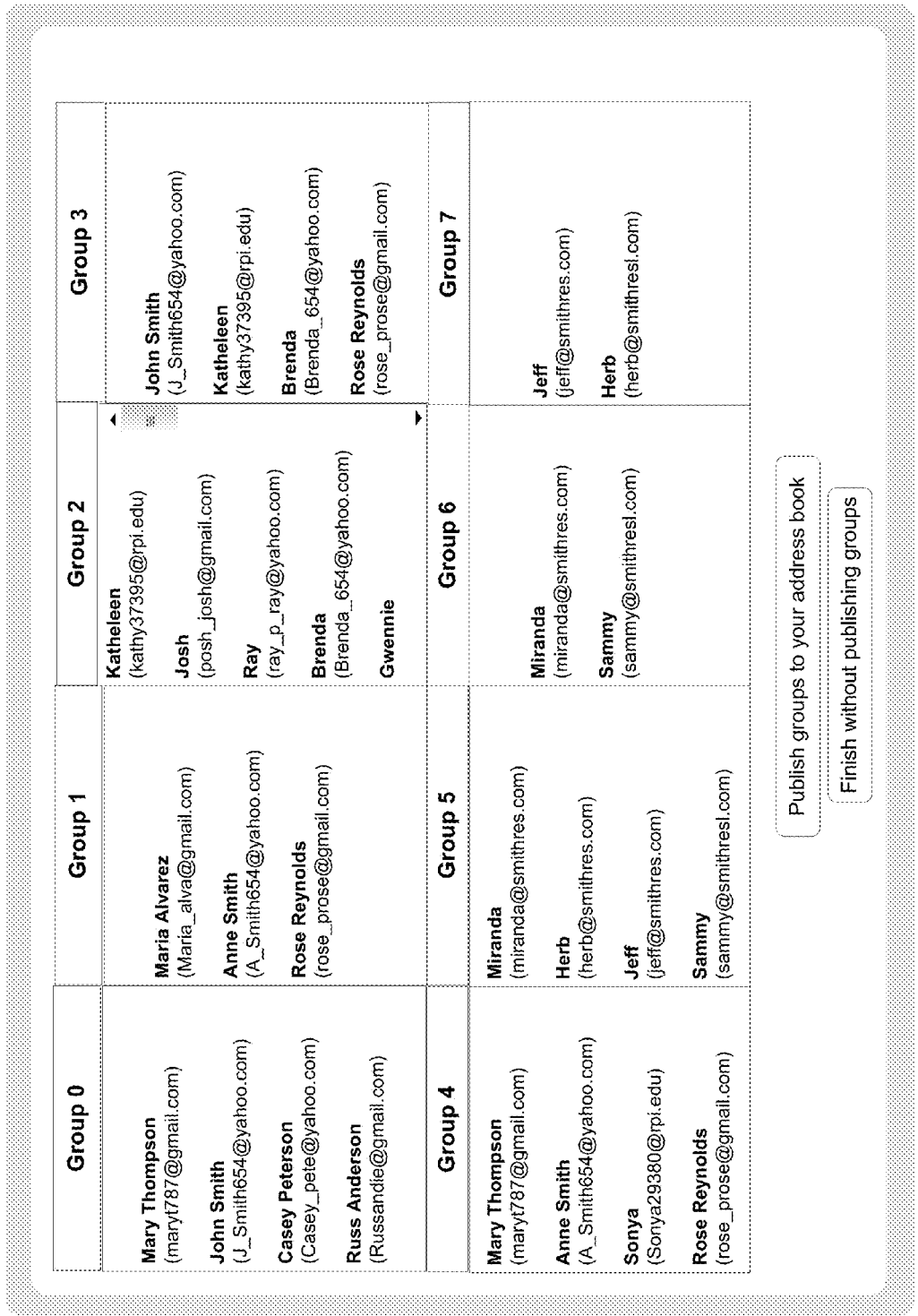
FIG. 7 illustrates a exemplary screen identifying the distinct social groups discovered using an algorithm, in one embodiment of the invention.

FIG. 7 illustrates a list of social groups that were generated by the algorithm based on the extracted social interaction data from one or more sources. The information provided in each social group is a result of the organization and the fine tuning performed by the algorithm. The algorithm provides an option to import the organized social groups back to the one or more sources, where the user can use them for subsequent social interactions. Alternately, the algorithm may allow a user to simply ignore the suggested social groups. In one embodiment, the importing of the organized social groups may be accomplished by using a "publish group" option provided by the algorithm at the user interface of the client device. It should be noted herein that even if the social interaction information for generating the social groups was derived from a particular source, the social group information may be used by other sources for social interaction by importing the same. For instance, an email account may have been used to extract social interactions and to organize an address book of the user. Accordingly, email activity of the user may have been analyzed to generate the various social groups. The generated social groups may then be imported back to the email provider, where the user may use them to compose emails. The user may also use the social groups to share photos using a photo sharing service, provide evites, etc.

Figure 8:
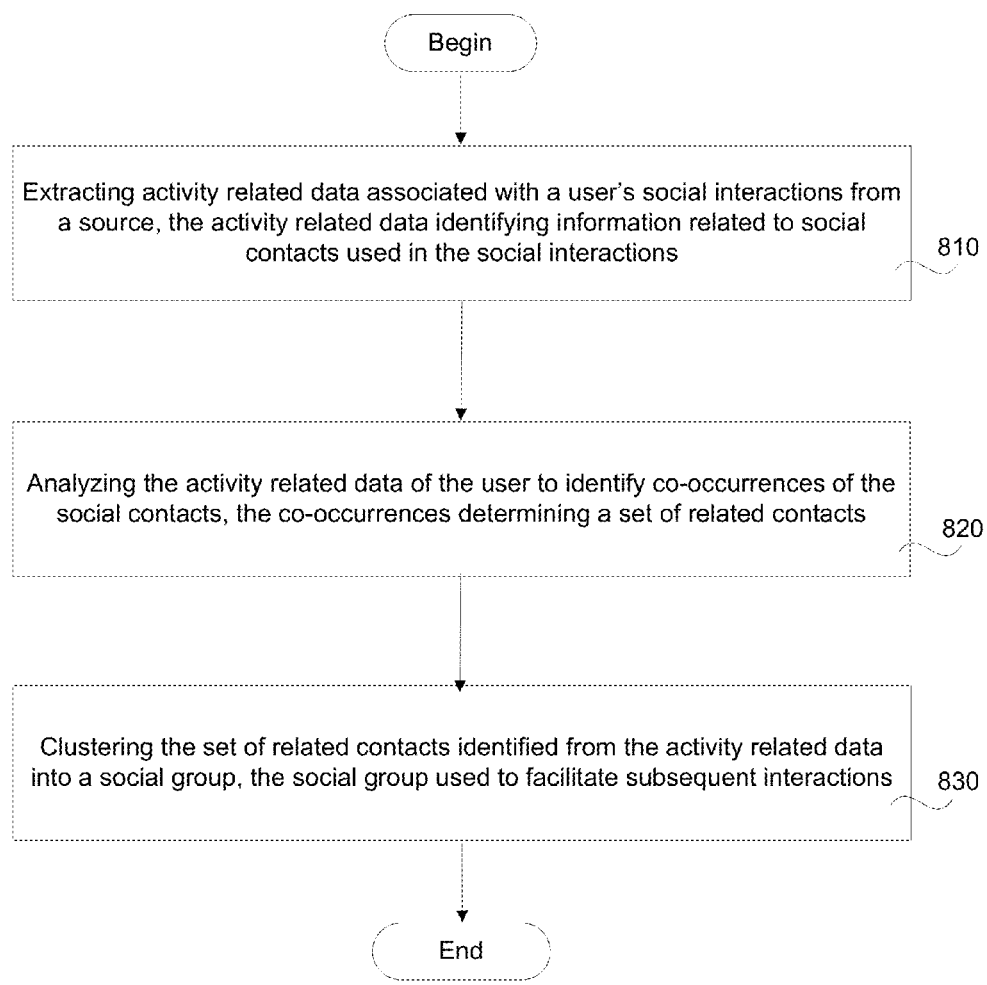
FIG. 8 illustrates a flow chart of various process flow operations used for discovering social groups, in one embodiment of the invention.

With the above detailed description of the various embodiments, a method for discovering social groups will now be described with reference to FIG. 8. As illustrated in FIG. 8, the process begins at operation 810 wherein activity related data associated with a user's social interactions is extracted from a source. The source could be an email provider or any other social interaction provider. The social interaction may be email chains exchanged between a user and a plurality of recipients and the activity related data identifies information related to the recipients (i.e. social contacts). As mentioned earlier, the source and number of social interactions from the source may be specified by a user at a user interface and an autogroup algorithm may extract the specified number of social interactions from the source for analysis. The activity related data is then analyzed to identify co-occurrences of social contacts to determine a set of related contacts, as illustrated in operation 820. In one embodiment, when a social contact is associated with more than one social group, the algorithm may extract header and content information from the activity related data, tokenize the header/content information and use the tokens along with the activity related data during analysis. The algorithm may determine a number of groups of related social contacts based on the analysis. The related social contacts are clustered together into distinct social groups, as illustrated in operation 830. The clustering may be provided by the algorithm based on a relative strength of the link/affiliation associated with each member of the social group. The algorithm may determine the number of times a user socially interacted with each of the social contacts within a social group that included other members of the social group and compute the affiliation strength of each social contact based on the number of times. The algorithm would then associate each of the social contacts within a social group with the respective affiliation strength and use this affiliation strength to rank the social contacts within each social group to indicate the order of relevance of the social contact in the social group. An indicator reflecting the affiliation strength of the social contact within the social group may be provided for each social contact so that when the social groups are presented at the user interface, the indicator would provide a visual cue of the affiliation strength of the social contact within the social group. The list of social contacts within each social group may be fine-tuned by allowing addition, deletion, updating of social contact information in the social group, renaming the social group, etc. The updated social group is used by the algorithm for presenting to the user for subsequent interaction.

The embodiments of the invention provide a tool that allows organization of a user's contact list from one or more sources into social groups based on the user's past social interactions. The algorithm may be implemented at each user level to generate the respective user's social groups, making it easy to distribute computation for many users across many machines in parallel. The social groups may be tagged using context-based tags to enable easy identification of proper social groups. The context-based tags are especially helpful to identify appropriate social groups particularly when one or more social contacts appear in more than one social group so as to ensure that the correct set of social contacts are identified for subsequent social interaction. The generated social groups may be imported into different sources and can be used for other form of social interactions, such as photo sharing, evite communication, etc.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for discovering social groups, comprising:
    extracting activity related data associated with a user's social interactions from a source, by a processor, the activity related data identifying information related to social contacts used in the social interactions;
    analyzing the activity related data of the user, by the processor, to identify co-occurrences of the social contacts in the social interactions, wherein the co-occurrences determine sets of related contacts, the analysis further determines relative affiliation strength of social link for each of the social contacts within each set of related contacts; and
    clustering the sets of related contacts identified from the activity related data to generate distinct social groups, by the processor, wherein a sequence of social contacts in each of the generated social groups are in accordance to the affiliation strength of each social contact within the respective social groups, the social groups used to facilitate subsequent social interactions,
    wherein when a particular social contact appears in more than one social group, clustering includes associating a tag derived from context of the activity related data to distinctly identify each of the social groups in which the particular social contact appears, each social contact in the respective social groups associated with an indicator that is indicative of affiliation strength within the social group, the indicator providing a visual cue of the affiliation strengths associated with the social contacts within the social group.

2. The method of claim 1, wherein the activity is an email activity and the activity related data relates to email chains exchanged between the user and the social contacts.

3. The method of claim 1, wherein context for the tag is determined by,
    extracting subject matter and content of the social interaction;
    analyzing the subject matter and content to identify the context of the social interaction;
    generating tokens for the subject matter and content of the social interaction; and
    adding the generated tokens to activity related data for analysis.

4. The method of claim 3, wherein analyzing the activity related data includes analyzing the generated tokens, wherein the tokens are used to further organize the social contacts into distinct social groups.

5. The method of claim 3, wherein analyzing further includes,
    pruning the social contacts within each of the social groups by analyzing the social contact information along with tokens of the content associated with the social group, wherein the pruning is based on user preferences of the user.

6. The method of claim 1, further includes fine tuning the generated social groups, wherein fine tuning includes adjusting one or more attributes related to the social contacts in a social group, deleting a social contact from a social group, adding one or more social contacts to a social group, renaming the social group or any combinations thereof.

7. The method of claim 1, further includes dynamically adjusting affiliation strength of one or more of the social contacts within a social group based on continued social interactions of the user, the adjusted affiliation strength used in adjusting the sequence of the social contacts within the social group.

8. A non-transitory computer program product comprising program instructions embodied on a computer readable medium, which when executed by a processor of a computer implements a method for discovering social groups, the program instructions comprising:
    program instructions for extracting activity related data associated with a user's social interactions from a source, the activity related data identifying information related to social contacts used in the social interactions;
    program instructions for analyzing the activity related data of the user to identify co-occurrences of the social contacts in the social interactions, wherein the co-occurrences determine sets of related contacts, the analysis further determines relative affiliation strength of each of the social contacts within each set of related contacts; and
    program instructions for clustering the sets of related contacts identified from the activity related data to generate distinct social groups, wherein a sequence of social contacts in each of the generated social groups are in accordance to the affiliation strength of each social contact within the respective social groups, the social groups used to facilitate subsequent social interactions, wherein when a particular social contact appears in more than one social group, program instructions for clustering includes program instructions for associating a tag derived from context of the activity related data to distinctly identify each of the social groups in which the particular social contact appears, and program instructions for associating an indicator to each social contact in the respective social groups, the indicator is indicative of affiliation strength within the social group, the indicator used to provide a visual cue of the affiliation strengths of the social contacts within the social group.

9. The computer program product of claim 8, wherein the activity is an email activity and the activity related data relates to email chains exchanged between the user and the social contacts.

10. The computer program product of claim 8, wherein program instructions for determining context for the tag further includes, program instructions for extracting subject matter and content of the social interaction;

program instructions for analyzing the subject matter and content to identify the content of the social interaction;

program instructions for generating tokens for the subject matter and content of the social interaction; and program instructions for adding the generated tokens to activity related data for analysis.

11. The computer program product of claim 10, wherein program instructions for analyzing the activity related data includes program instructions for analyzing the generated tokens, wherein the tokens are used to further organize the social contacts into distinct social groups.

12. The computer program product of claim 10, wherein program instructions for analyzing further includes, program instructions for pruning the social contacts within each of the social groups by analyzing the social contact information along with tokens of the content associated with the social groups, wherein the pruning is based on user preferences of the user.

13. The computer program product of claim 8, further includes program instructions for tuning the generated social groups, wherein the tuning includes adjusting one or more attributes related to the social contacts in a social group, deleting a social contact from a social group, adding one or more social contacts to a social group, renaming the social group or any combinations thereof.

14. The computer program product of claim 8, wherein the program instructions further includes, program instructions for dynamically adjusting affiliation strength of one or more of the social contacts within a social group based on continued social interactions of the user, the adjusted affiliation strength used in adjusting the sequence of the social contacts within the social group.

15. A system for discovering social groups, comprising:

a server executing an algorithm on a processor, wherein the algorithm is configured to, extract activity related data associated with a user's social interactions from a source, the activity related data identifying information related to social contacts used in the social interactions;

analyze the activity related data of the user to identify co-occurrences of the social contacts in the social interactions, wherein the co-occurrences determine sets of related contacts, the analysis further used to determine relative affiliation strength of each of the social contacts within each set of related contacts; and cluster the set of related contacts identified from the activity related data to generate distinct social groups, the social groups used to facilitate subsequent interactions, wherein a sequence of social contacts in each of the generated social groups are in accordance to the affiliation strength of each social contact within the respective social groups, wherein when a particular social contact appears in more than one social group, associate a tag derived from context of the activity related data to distinctly identify each of the social groups in which the particular social contact appears, each social contact in each of the social groups is associated with an indicator that is indicative of affiliation strength within the social group, the indicator is used to provide visual cue of the affiliation strengths of the social contacts within the social group.

16. The system of claim 15, further includes a database for storing the generated social groups and one or more attributes of the social contacts in each of the social groups.

* * * * *